May 12, 1936. E. R. BULMER 2,040,728

TRAILER BRAKE

Filed March 5, 1935 2 Sheets-Sheet 1

Ernest R. Bulmer, INVENTOR

BY Victor J. Evans & Co. ATTORNEY

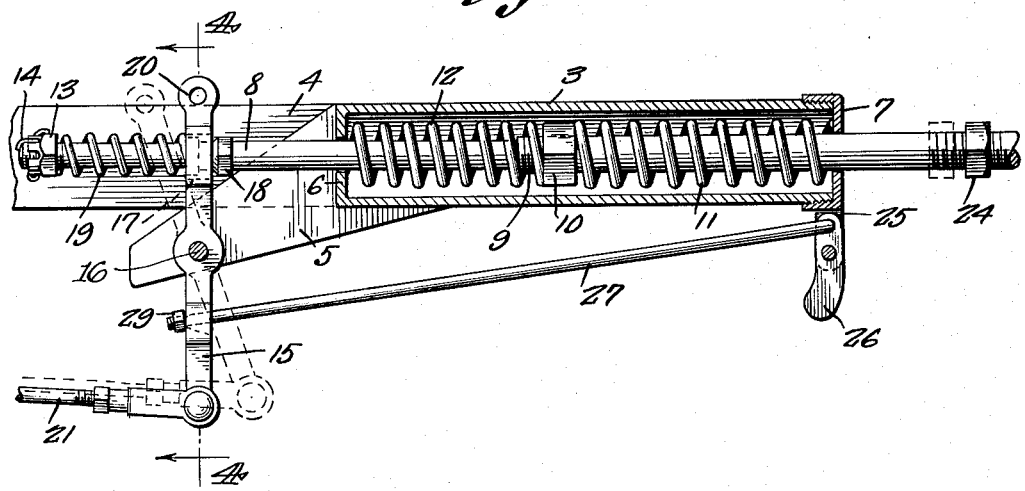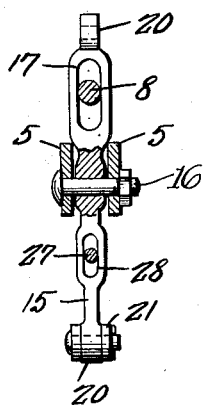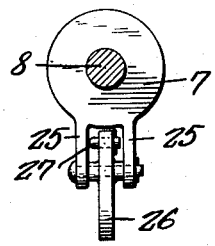

Patented May 12, 1936

2,040,728

UNITED STATES PATENT OFFICE 2,040,728

TRAILER BRAKE

Ernest R. Bulmer, Great Falls, Mont.

Application March 5, 1935, Serial No. 9,523

4 Claims. (Cl. 188—112)

This invention relates to vehicle brakes and has for its object the provision of a simple mechanism whereby the brakes on a trailer will be automatically applied when going down hill, or if the towing car should stop, or the trailer should break loose from the car. Incidental objects will appear as the description proceeds, and the invention resides in certain novel features which will be particularly defined in the appended claims.

In the annexed drawings, which illustrate one embodiment of the invention:

Figure 3 is a view of the operating mechanism, partly in side elevation and partly in vertical section.

Figure 4 is a section on the line 4—4 of Figure 3.

Figure 5 is a front elevation of the trip lever, with the push rod in section.

Figure 1:
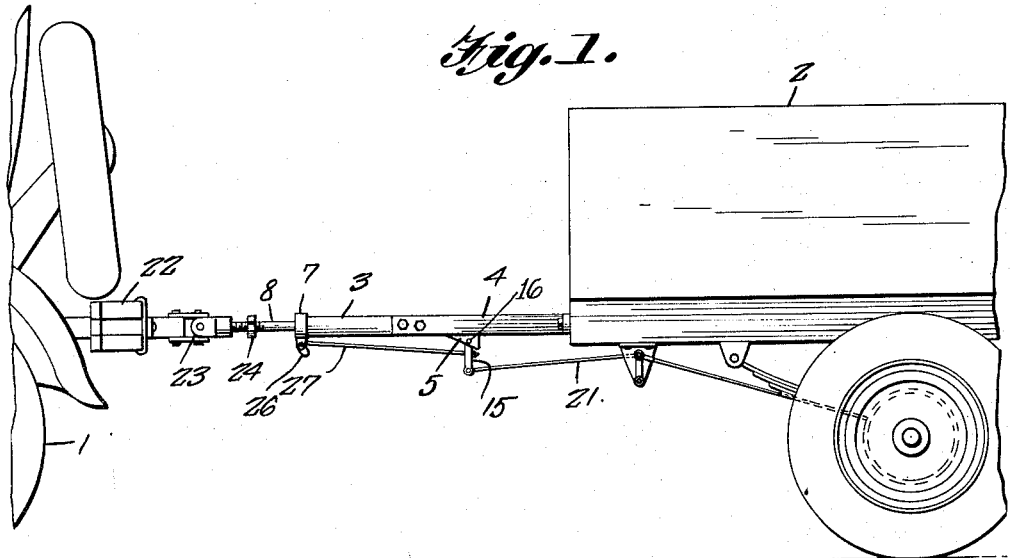
Figure 1 is an elevation of portions of an automobile and a trailer equipped with my improved brake mechanism.
Figure 2:
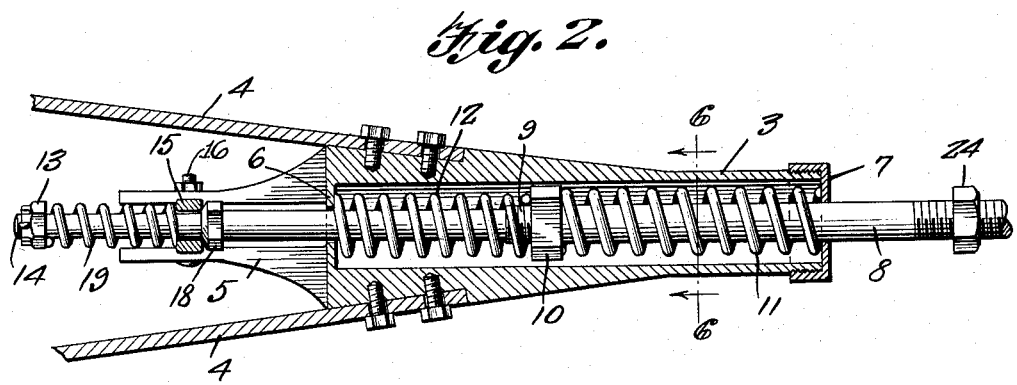
Figure 2 is an enlarged horizontal section through the brake-operating mechanism.
Figure 6:
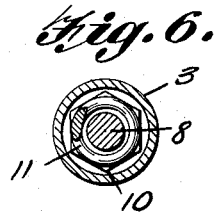
Figure 6 is a section on the line 6—6 of Figure 2.

In the drawings, the reference numeral 1 designates the rear end of an automobile and 2 designates the forward portion of a trailer of the two wheel type drawn by the automobile.

In carrying out the present invention, a tubular body or frame 3 is equipped at its rear end with rearwardly diverging side arms 4 which are firmly secured to some fixed element at the front end of the trailer, and a rearwardly and downwardly projecting bracket 5 is secured to or formed integral with the under side of the body at the rear extremity thereof. The rear end of the bore of the body is closed by an integral web 6 having a central opening while the front end of the body is open but covered by a cap 7 threaded thereon and also provided with a central opening. Slidably fitted through the openings in the web and the cap is a push rod 8 which is provided, intermediate its ends, with a short threaded portion 9 on which is mounted a nut 10, a relatively strong spring 11 being coiled around the rod between the cap and said nut. Between the nut and the web 6, a lighter regulating spring 12 is coiled around the push rod, and on the rear extremity of the rod a nut or abutment 13 is secured by a cotter pin or other device 14. It will be noted that the bracket 5 is forked or slotted, and a brake lever 15 is extended through the fork or slot and pivoted therein, as shown at 16, said lever having a slot 17 in its upper portion through which the push rod passes. An abutment 18 is provided on the push rod in front of the brake lever and normally bears against the lever while a spring 19, coiled around the rod between the lever and the nut 13 yieldably holds the lever to the abutment 18. The lever is provided with an eye 20 at each end so that the brake rods 21 may be attached at the upper or the lower end of the lever according to the arrangement of the brakes at the trailer wheels.

The front end of the push rod is connected to a draw bar 22 on the automobile by a universal coupling 23 so that the trailer may move freely in all directions relative to the automobile without causing distortion or separation of the parts. A nut 24 is mounted on the forward end portion of the push rod to constitute a stop adapted to impinge against the cap 7 and thereby limit the relative movements of the push rod and the body 3. By properly adjusting the nuts 24, 10 and 18, the movement of the push rod relative to the body may be nicely regulated and effective operation of the brakes will be attained, the forward movement of the push rod being arrested by the nut 18 impinging against the web 6.

The cap is provided with a pair of depending lugs 25 between which is pivotally mounted a trip lever 26 having its lower end depending below the lugs and having a link 27 pivoted to its upper end, the rear end of said link normally playing through a slot 28 in the lower portion of the brake lever. A nut 29 on the rear end of the link 27 abuts the rear edge of the brake lever so that if the trip lever be rocked, the brake lever will be actuated to apply the brakes.

When traveling on a level road or an upgrade, the spring 11 serves to maintain the push rod and the body 3, which may be considered the draft pole of the trailer, in proper relation to transmit the draft to and effect towing of the trailer, the spring absorbing the shocks due to the trailer tending at times to lag. On a downgrade, or when the automobile stops or slows down, the trailer tends to run ahead and the body or frame 3 is, consequently, carried forward relative to the push rod and the brake lever thus rocked, as indicated by dotted lines in 3, to apply the brakes. The trailer is thus momentarily halted. The push rod, however, continues to move with the automobile and the several springs restore the normal relation of the parts so that the trailer instantly resumes its travel. Forward motion of the body relative to the push rod is cushioned by the spring 12 and is arrested by impact of the cap 7 against the nut 24 while excessive rearward movement of the body relative to the push rod is arrested by impact of the nut 18 against the web 6. By removing the cap 7 and the nuts 13 and 18, the push rod with the nut 10 and the springs 11 and 12 may be withdrawn to permit readjustment of the nut 10 or rewinding or other repairs to the springs.

Should any of the connections between the automobile and the trailer break so that the draft pole or body falls, the trip lever 26 will come into contact with the ground and will be rocked so as to pull upon the brake lever through the link 27 and thereby apply the brakes and stop the trailer.

Having described my invention, what I claim is:

1. A brake mechanism comprising a push rod, means for coupling said rod to a vehicle, a support for said rod, means for securing the support to a trailer, a brake lever mounted on the support and arranged to be actuated by relative movement of the push rod, a trip lever mounted on the under side of the support to be actuated upon dropping of the support to the ground, and a lost-motion connection between the trip lever and the brake lever.

2. A brake mechanism comprising a push rod, means for coupling the rod to a towing vehicle, a support in which the rod is relatively slidable, means for securing the support to a trailer, a brake lever fulcrumed on the support and provided with slots in its upper and lower end portions, the push rod passing through the upper slot, a trip lever on the support, a link pivoted to the trip lever and passing through the lower slot in the brake lever, and an abutment on the link adapted to rock the brake lever upon actuation of the trip lever.

3. A brake mechanism comprising a support, a brake lever fulcrumed on the support, a trip lever on the support, and a connection between the two levers whereby upon dropping of the support the brake lever will be operated.

4. A brake mechanism comprising a tubular support having a web closing its rear end, a cap fitting over the front end of the support, a push rod slidably engaged through the web and the cap, a nut on the rod within the support, springs coiled around the rod between the nut and the cap and between the nut and the web respectively, a nut on the rod at the rear of the support, a brake lever fulcrumed on the support and having an end bearing against the last-mentioned nut, and a spring holding the brake lever to said nut.

ERNEST R. BULMER.